US006766434B2

(12) United States Patent
Gaertner et al.

(10) Patent No.: US 6,766,434 B2
(45) Date of Patent: Jul. 20, 2004

(54) METHOD FOR SHARING A TRANSLATION LOOKASIDE BUFFER BETWEEN CPUS

(75) Inventors: Ute Gaertner, Schoenaich (DE); Norbert Hagspiel, Wendlingen (DE); Frank Lehnert, Stuttgart (DE); Erwin Pfeffer, Holzgerlingen (DE); Kerstin Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 10/126,239

(22) Filed: Apr. 19, 2002

(65) Prior Publication Data

US 2002/0156989 A1 Oct. 24, 2002

(30) Foreign Application Priority Data

Apr. 20, 2001 (EP) .............................. 01109711

(51) Int. Cl.$^7$ .............................................. G06F 12/08
(52) U.S. Cl. .................. 711/207; 711/130; 711/147; 711/154
(58) Field of Search ................ 711/207, 154, 711/147, 130

(56) References Cited

U.S. PATENT DOCUMENTS

| 5,412,787 A | * | 5/1995 | Forsyth et al. ............. 711/207 |
| 5,606,683 A | * | 2/1997 | Riordan ...................... 711/207 |
| 5,787,476 A | * | 7/1998 | Laudon et al. ............. 711/141 |
| 5,956,754 A | * | 9/1999 | Kimmel ....................... 711/206 |
| 6,075,938 A | * | 6/2000 | Bugnion et al. ............. 703/27 |
| 6,182,195 B1 | * | 1/2001 | Laudon et al. ............. 711/141 |
| 6,260,131 B1 | * | 7/2001 | Kikuta et al. .............. 711/210 |
| 6,370,632 B1 | * | 4/2002 | Kikuta et al. .............. 711/205 |
| 6,418,521 B1 | * | 7/2002 | Mathews et al. ........... 711/207 |
| 6,418,522 B1 | * | 7/2002 | Gaertner et al. ............ 711/207 |

OTHER PUBLICATIONS

Channon et al., "Performance Analysis of Re–Configurable Partitioned TLBs," pp 168–177, IEEE, Jan. 1997.*
Ekanadham et al., "PRISM: An Integrated Architecture for Scalable Shared Memory," pp 140–151, IEEE, Feb. 1998.*

* cited by examiner

Primary Examiner—Kevin L. Ellis
Assistant Examiner—Stephen Elmore
(74) Attorney, Agent, or Firm—Floyd A. Gonzalez (57) ABSTRACT

The present invention generally relates to shared-memory multiprocessor systems, such as IBM ESA/390 or RS/6000 systems, and deals more particularly with a method and system for sharing a second-level translation lookaside buffer (TLB 2) between several CPUs (30a, . . . 30d) for improving the performance and reducing the chip area required to buffer the results of virtual-to-absolute address translations. The inventive TLB2 organization comprises several small arrays (32a, . . . 32d) dedicated to particular CPUs, providing an interface to a major array (21), which is shared between the CPUs. The dedicated arrays 32a, . . . 32d) are required to fulfill the architected constraints and link several CPUs to the commonly used shared array (21).

13 Claims, 7 Drawing Sheets

Block Diagram of a Translation Functional Unit

Conceptual Array Layout

METHOD FOR SHARING A TRANSLATION LOOKASIDE BUFFER BETWEEN CPUS

BACKGROUND OF THE INVENTION

The present invention generally relates to shared-memory multiprocessor systems, such as IBM ESA/390 or RS/6000 systems, and deals more particularly with a method and system for sharing one translation lookaside buffer (TLB) between several CPUs.

The main memory is considered the physical memory in which many programs want to reside. However, due to the limited size of a physical memory in a computer system not all programs can be loaded simultaneously. The virtual memory concept was introduced to alleviate this problem. The basic idea of said prior art approach is to expand the use of the physical memory among many programs with the help of an auxiliary (backup) memory such as disk arrays. All programs can be loaded in and out of the physical memory dynamically under the coordination of the operating system. To the users, virtual memory provides them with almost unbounded memory space to work with. In a process called 'address translation' such virtual addresses are transformed into physical addresses, which uniquely define physical locations in the main memory at run-time.

Both, the virtual and physical memory is partitioned into fixed-length pages of usually 4 kilobytes. When a translation for a virtual page is used, it will probably be needed again in near future of the program run, because the references to the words on that page have both temporal and spatial locality. Accordingly, modern machines includes a special cache that keeps track of recently used translations. This special address translation cache is further referred to as translation-lookaside buffer, or TLB.

State of the art micro processors have already all basic functional units of the processor such as arithmetic logic unit, floating point unit, TLB, first-level cache, etc. integrated on a single chip and it can be foreseen that the next processor generation will have two or several independent operating processors on a single chip. Not all functional units are required to be dedicated to a particular CPU and can be shared between different CPUs.

The sharing of functional units between CPUs is a common practice for second level caches, while the first level cache with a one cycle access time is dedicated to a particular CPU and thus provides optimal performance, but the one cycle access requirement limits the size of the array to less than 128 kilobyte for state of the art processors. The second level cache with a capacity of several megabyte is shared between CPUs thereby offering a better utilization of the array and even more, if several CPUs access so-called common memory space, e.g., in case of a read-only source code of a compiler, one and the same data portions buffered in the second level cache is available for different CPUs.

The arguments which are valid for implementation of a shared second level cache apply also for a shared second level TLB, further on called shared TLB2, because all data in the shared cache are accessed using absolute addresses, while the shared TLB2 buffers the mapping of virtual to absolute addresses.

Thus, there is a general need for sharing a TLB between several CPUs for improving the performance and reducing the chip area required to buffer the results of virtual to absolute address translations.

Figure 1:
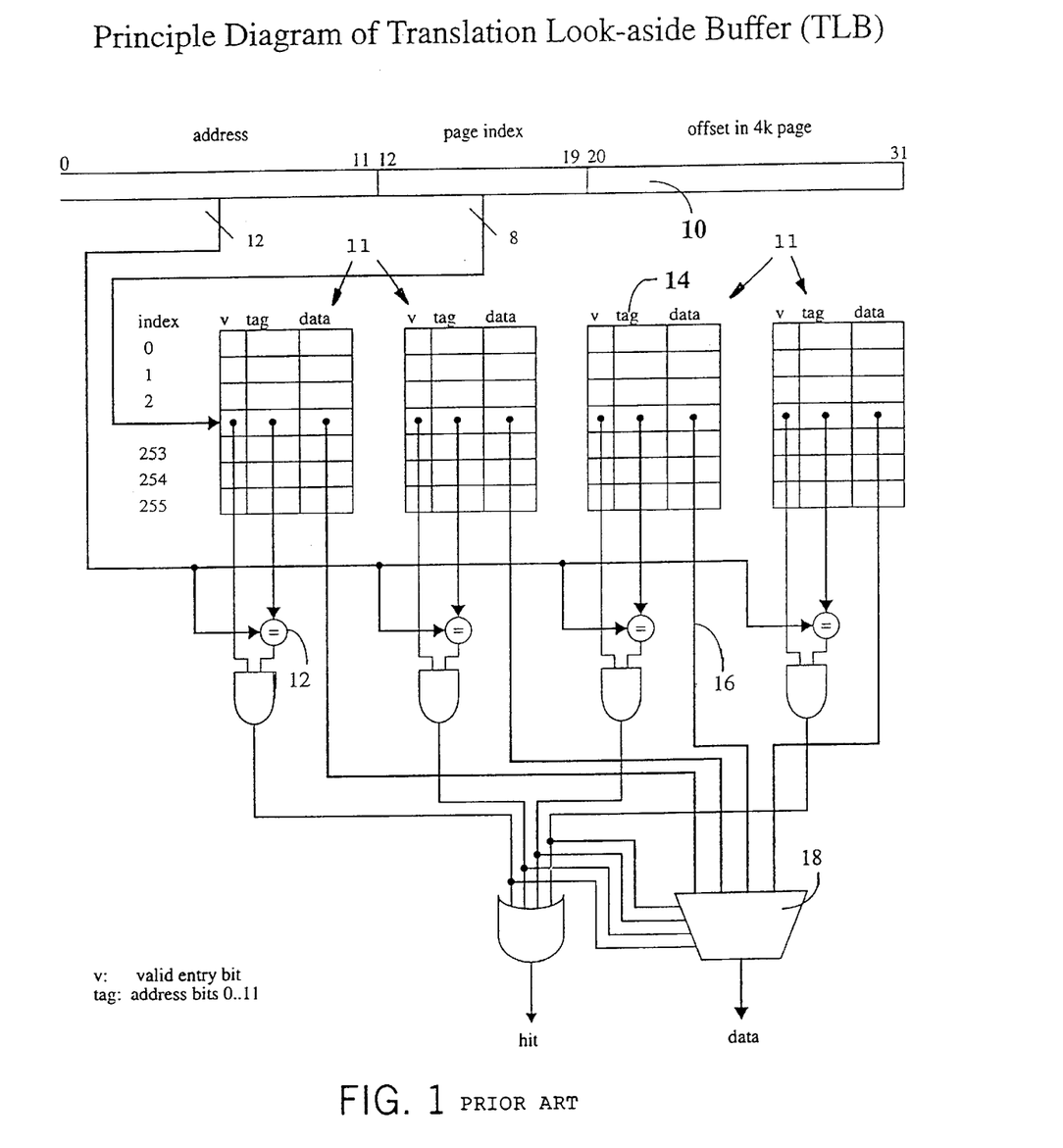
FIG. 1 is a schematic representation illustrating a principle diagram of a prior art translation loookaside buffer (TLB)

With reference to FIG. 1a prior art implementation of a 4-way set-associative cache used as a TLB in address translation is described in more detail in order to introduce the TLB architecture details needed to understand the concepts of the present invention.

A 32 bit virtual address 10 abbreviated further as VA is an object of the address translation. Bits 12 to 19 of it are used as an index in order to address a specific row in each of the 4 compartments of the TLB. Bits 0 to 11 are compared in comparators 12 with the tag field 14 of the associated row.

The comparators 12 determine which element of the selected compartment matches the tag. The output of the comparators is used to select the data 16 from one of the four indexed compartments, using a multiplexor 18.

The IBM ESA/390 and ESAME CPU architecture are taken as reference to explain the architectural requirements for sharing a TLB2 between different CPUs. Although these architectures don't explicitly prohibit the implementation of a shared TLB2, it is obvious that all rules valid for forming TLB entries for a dedicated TLB must also be obeyed for a shared TLB2, i.e. a shared TLB2 must be transparent as seen from the architecture point of view.

The formation of TLB entries is only permitted with the use of translation tables attached to a particular CPU.

This rule was established because a particular CPU, which has purged its dedicated TLB from all entries and has dynamic address translation disabled and is in the process to set up new translation tables, should not get access to translations set up by another CPU by means of a shared TLB2. Instead, it should only get translations, which are built with its own attached tables.

Special rules also apply if one particular CPU purges all entries in its dedicated TLB, then all shared TLB2 entries must be purged, too, but entries shared by other CPUs should remain valid.

Another problem arises if a TLB entry is manipulated by a process called prefixing. Prefixing assigns a unique prefix address to a translation result of zero, because page address zero contains various architected data values dedicated to a particular CPU. In a multiprocessor system with shared memory, each CPU has an unique prefix register, because 'page zero' is only one time available in main memory. Therefore, TLB entries prefixed by a CPU A are not to be used by a CPU B.

As can be appreciated now by a person skilled in the art, because of the above implications, a shared TLB2 was never realized.

SUMMARY OF THE INVENTION

It is an object of the present invention to provide a method and system for sharing a TLB2 between CPUs which is transparent to the CPU architecture and thus in compliance with the architecture rules.

The inventive TLB2 organization comprises several small arrays dedicated to particular CPUs, providing an interface to a major array, which is shared between CPUs. The dedicated arrays are required to fulfill the architected constraints and link several CPUs to the commonly used shared array.

According to its primary aspect the present invention provides a method for operating a second level Translation Lookaside Buffer (TLB) in a Symmetric MultiProcessor (SMP) system which is characterized by the steps of:

a. using a respective plurality of processor memory areas further referred to herein as CRTs uniquely dedicated to each of said multiple processors for storing virtual address data and an origin pointer, e.g., the page table origin (PTO), in order to locate the absolute address associated with said virtual address, b. using a common memory area, further referred to as PTE shared between said processors for storing at least said absolute address asociable with a virtual address stored in any of said plurality of processor memory areas, c. defining a TLB hit on a virtual address applied by any of said processors by d. checking if subaddress data, e.g., the segment index of the virtual address of said applied virtual address matches with respective subaddress data stored in said common memory area, and e. checking if the respective entries of the processor memory area and the common memory area are flagged 'valid'.

Further, when said subaddress data is the segment index of a virtual address, and a plurality of least significant bits of the virtual address is stored as a tag data together with the absolute address in an entry of said common memory area an efficient implementation of the inventional concept is provided.

Further, when performing a concurrent lookup in both, the processor and the common memory area the TLB2 is effectively sharable between CPUs.

Further, when providing a fixed number of processor memory areas associated to a respective plurality of n-set associative storage elements in the common memory area according to the sequence of said processor memory areas, then, an area-saving way to organize the inventive TLB2 is found.

A Symmetric MultiProcessor (SMP) hardware unit, e.g., a chip can advantageously take profit from an implementation performing the inventive method according to one of the before-mentioned aspects.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

With general reference to the figures and with special reference now to FIGS. 2 and 3, the basic concept involved in address translation according to the invention is described in more detail below.

Figure 3:
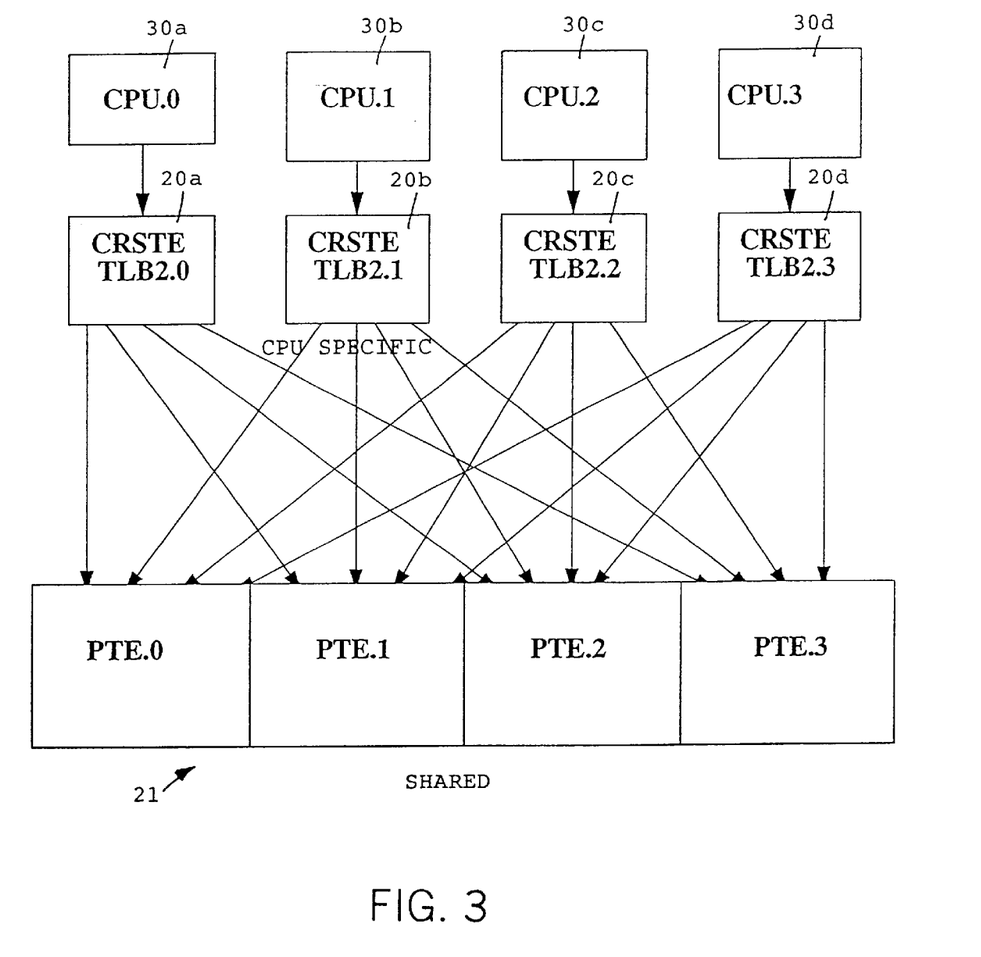
FIG. 3 is a schematic representation showing a block diagram of a multiprocessor system with a second level TLB shared between several CPUs according to the invention.

A basic block diagram of a preferred TLB2 embodiment for an exemplary configuration of 4 CPUs is shown in FIG. 3.

The TLB2 embodiment comprises several small arrays 20a, . . . 20d dedicated each to a particular CPU 30a, . . . 30d, and providing an interface to a major array 21 which is shared between the CPUs. The dedicated arrays 20 are required to fulfill the architected constraints and link several CPUs to the commonly used shared array.

In FIG. 3, a dedicated array 20a, . . . 20d is further referred to with CRTs TLB2 (Combined Region and Segment Table Entry TLB2), and the large jointly used array 21 is referred to as PTE TLB2 (Page-Table Entry TLB2).

Each CPU 30 (0 . . . 3) has a dedicated CRTs TLB2 20 (0 . . . 3). Associated PTE entries for a given CRTs entry may be placed anywhere in one of the four PTE TLB2 (0 . . . 3). This is denoted by the plurality of arcs between them.

Figure 2:
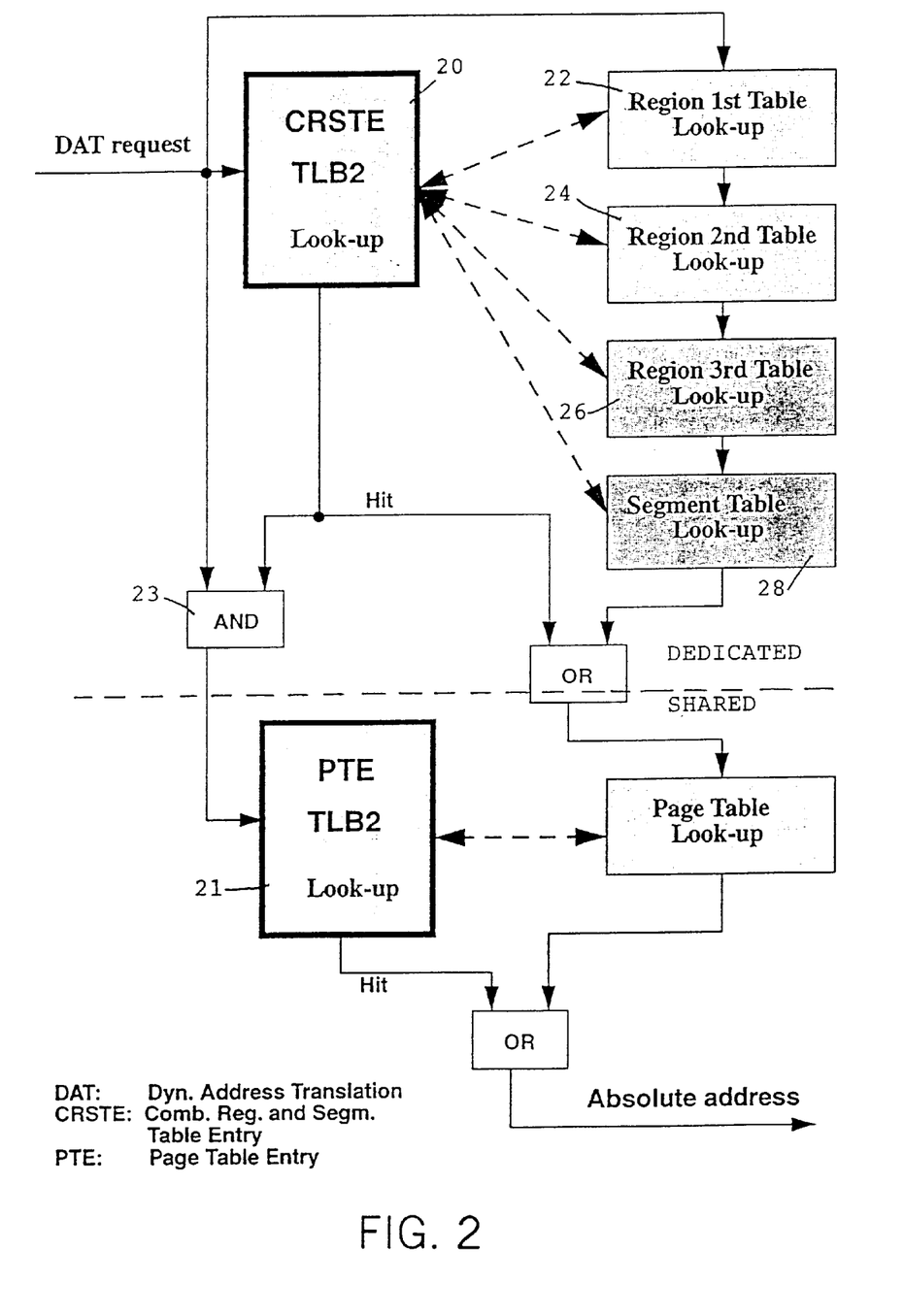
FIG. 2 is a schematic representation illustrating the conceptual dynamic address translation (DAT) request handling according to the invention.

Reference should now be made to FIG. 2. CPU-specific (dedicated) part 20, 'CRTs TLB2':

This part 20 comprises the page table origin (PTO) as intermediate translation results calculated using the higher level translation tables such as region or segment tables 22, 24, 26, 28. The CRTs TLB2 organization is similar to the state-of-the-art implementations of a unified TLB shown in FIG. 1, with the essential difference, that the result data stored in the arrays 11—see FIG. 1—is not the final absolute address to access the main memory. Instead, it contains the address to the last translation table, the PTO.

Figure 4:
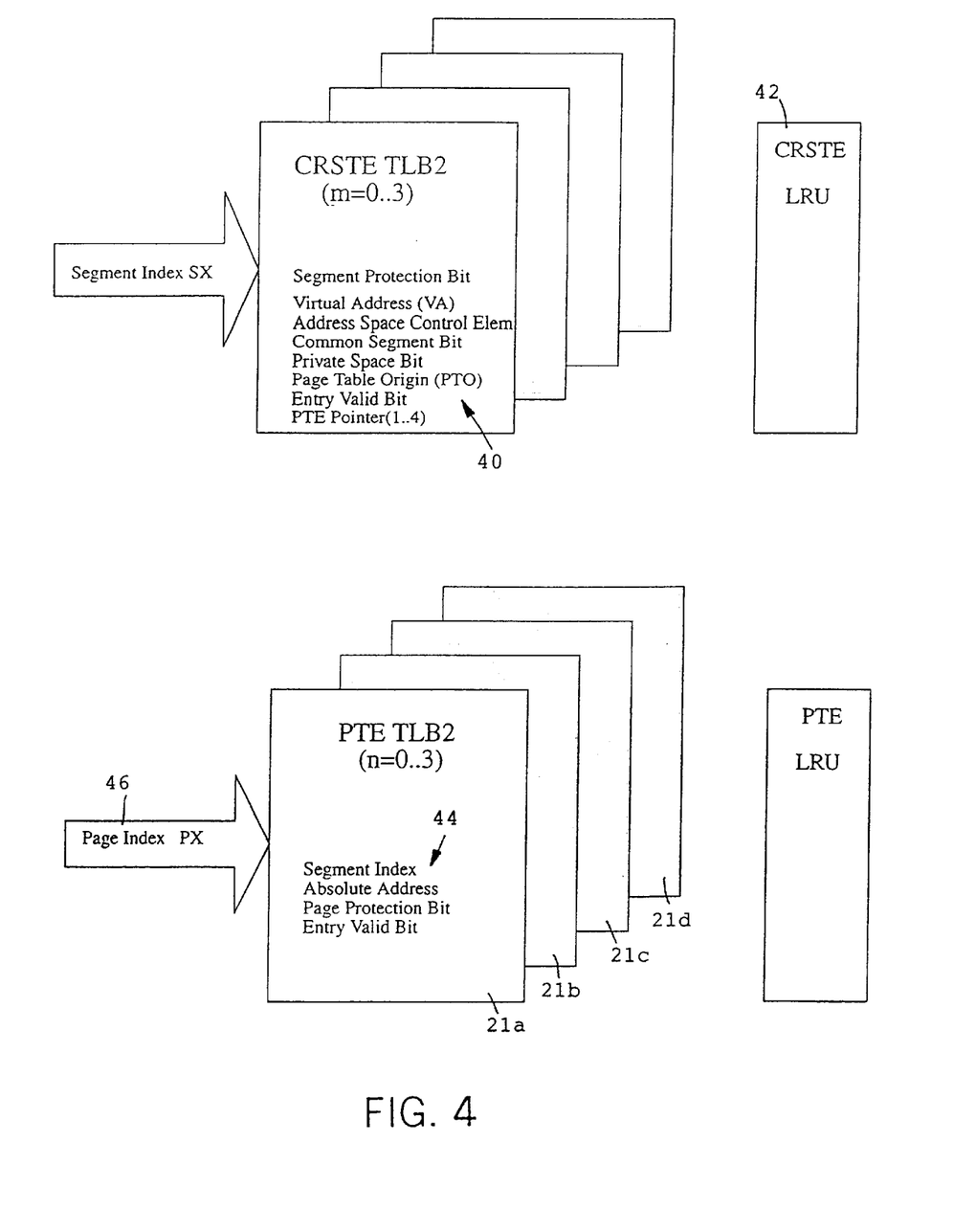
FIG. 4 is a schematic representation showing the conceptual structure of a CRTs and a PTE in a TLB2 shared according to the invention.

The CRTs TLB2 comprises architected compare control data 40, as shown in FIG. 4 in more detail, such as the address space control element (ASCE), the pointer to the first translation table, the common segment bit, indicating that the ASCE compare may be omitted, the private space bit, marking entries which are private (not common) to this CPU, the segment protection bit, indicating 'write-protection', and part of the virtual address, required as compare value in the hit case.

As an essential non-architected data, the CRTs comprises the PTE pointer, indicating the associated PTE TLB2 number 0 . . . 3 (for 4 CPUs), and the compartment 0 . . . 3, connected to this CPU. A LRU logic 42 is provided for casting out the least recently used (LRU) entries.

Shared part 21 'PTE TLB2':

With reference to FIG. 2, the PTE TLB2 part 21 comprises the page table entries (PTE), the final translation results generated using the PTO from the CRTs to look-up the page table, and the page protection bit, indicating that the page is 'write-protected'. The PTE is shared between particular CPUs.

It will be understood that sharing only the PTE TLB2 and not sharing the CRTs TLB2 has no essential disadvantage, because the CRTs TLB2 is very small as compared to the PTE TLB2. A useful, practical capacity of a CRTs TLB2 is approximately 512 entries, found by different performance analysis modeling tasks, whereas the capacity of the PTE TLB2 is ten times larger and contains usually more than 4096 entries, based on the fact that in average 10 out of 512 entries of a page table contain valid translations.

Next, the linking of PTE Values to a CRTs PTO will be described in more detail with additional reference to FIGS. 4 and 5.

Whenever an entry is made into the CRTs/PTE structure, then the address bits used to address the CRTs array, i.e., the segment index 44 as a part of the virtual address is stored in the PTE array 44 itself, at the address given by the page index 46 of the virtual address with the purpose that each entry in the PTE TLB2 is assigned to a unique CRTs value. This link is necessary in addition to the PTE pointer.

A PTE value linked to a CRTs entry can be placed everywhere in the set-associative PTE TLB2, belonging to a particular CPU, i.e., in one of the 4 compartments 21a, ... 21d and at any place.

Next, the use of TLB2 entries according to the depicted embodiment will be described in more detail.

A hit in the TLB2 is found and the buffered absolute address can be used if a valid entry in the CRTs and the PTE TLB2 exists—see the AND gate 23—and if the applied CRTs address (segment index of the VA) matches with the buffered CRTs address in the PTE array, and other tag data, e.g., remaining address bits of the applied virtual address match with the tag data (stored remaining bits of the virtual address) in the array.

A hit in the PTE TLB2 occurs if the applied segment index matches with the segment index stored in the PTE value.

The lookup is performed simultaneously in the dedicated and the common part.

Next, the replacement of TLB2 entries will be described.

Whenever a CRTs entry at a given segment index applied to the CRTs array must be replaced by a newer one as predicted by the CRTs LRU value, then all PTE values having the same segment index stored must be invalidated. This is preferably accomplished with a CAM (contents addressable memory), which resets all valid bits in the PTE array matching in the applied data to the CAM (segment index) and the data stored in the CAM.

Figure 5:
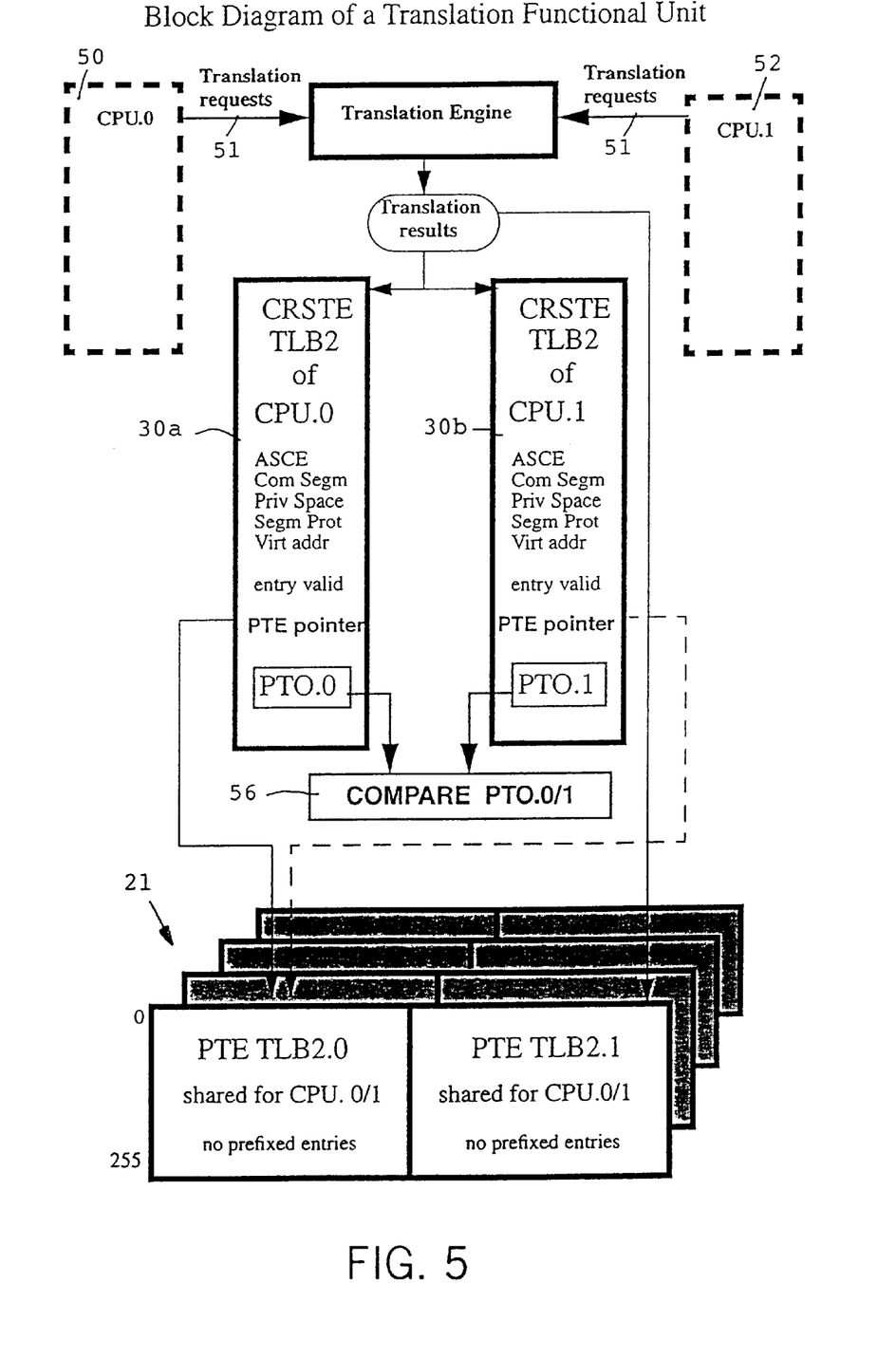
FIG. 5 is a schematic representation showing a block diagram of a translation functional unit illustrating some aspects of the control flow of the inventive method.

Next, a more detailed description of the Translation Hardware is given with special reference to FIG. 5 for the purposes of completeness.

The formation of TLB2 entries is accomplished by means of translation functional unit as shown in FIG. 5 as a block diagram for 2 exemplary CPUs 50, 52, respectively, which share one jointly used PTE TLB2 21. Translation requests 51, composed of the virtual address (VA), the Address Space Contol element (ASCE), and control data are sent to the Translation engine 53, which controls the translation process.

The first process step is to look-up the TLB2, and start in parallel the translation sequence.

If a hit in TLB2 is found, the translation stops and the absolute address is sent back to the requesting CPU. In case of a miss, the translation continues to process the absolute address by means of looking-up the translation tables in main memory until the absolute address value is determined, which is written into the TLB2 and sent back to the requesting CPU.

The translation process comprises the processing of the CRTs value, i.e., the PTO if no hit in the CRTs TLB2 is found. This value is compared—56—with the PTO values of all other CPUs having a hit for the applied translation request. If two matching PTOs are found, then the newly determined PTO is connected to the PTE TLB2 of the matching PTO, with the result that both CPUs share all associative entries in the PTE TLB2 of the other CPU. From now on, new entries as determined by this or the other CPU are written into the jointly used PTE TLB2.

Next, the formation of shared TLB2 entries will be described structurally with reference to FIG. 6. A preferred respective control flow is later given with reference to FIG. 7.

Figure 6:
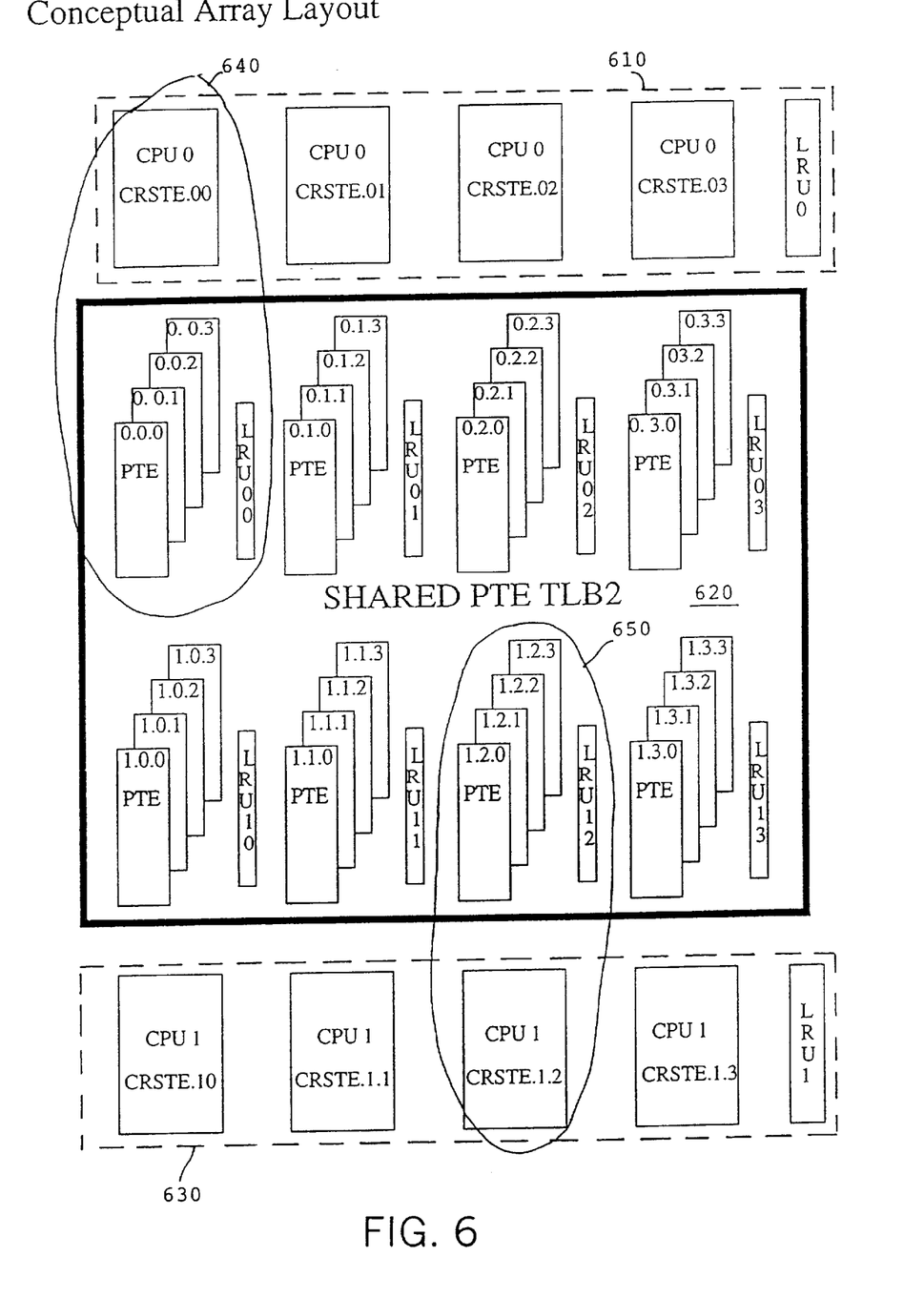
FIG. 6 is a schematic representation giving a conceptual overview of a preferred array layout of a TLB2 according to the invention.

As a general rule of the preferred embodiment, new PTE entries in the area 620, with no matching Page Table Origin (PTO) in the CRTs entry 610, 630 of other CPUs are generally written to the preferably equally indexed PTE compartment, see the rectangles 640, 650, for example, e.g., a new entry for CPU.1 is written into CRTs.1m, (m=0 ... 3) as it can be seen in FIG. 6, rectangle 630 (bottom part), whereby m is predicted by the LRU.1 logic.

Thus, for example, the CRTs array 630 dedicated to CPU.1 and the associated PTE entry is written into PTE compartment, e.g., 650, PTE.1.m.n (n=0 ... 3), with n predicted by the LRU.1.m.

PTE entries, which have a matching page table origin (PTO) in the CRTs TLB2 of another CPU are written into the PTE compartment of the CPU with the matching PTO, e.g., if CPU.0 writes a TLB2 entry, then the CRTs.0.m is used to buffer the CRTs value and if a matching PTO is found in CRTs.1.m, then all additionally required PTE entries are written into PTE.1.m.n. This requires that each CRTs entry has a pointer—abbreviated as 'pm' in FIG. 7—to the PTE compartment.

Figure 7:
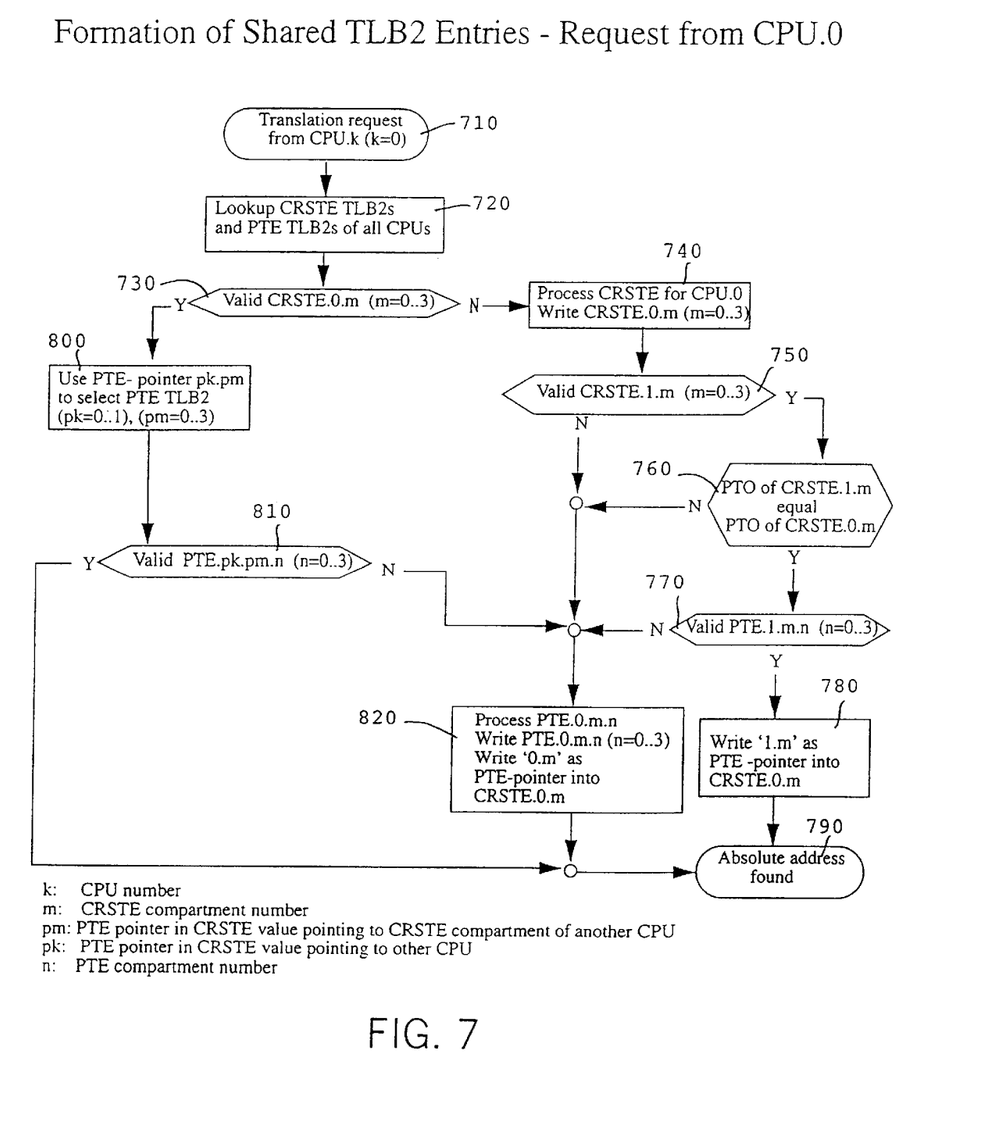
FIG. 7 is a schematic representation showing some details of the control flow in the inventive method during the formation of shared TLB2 entries with a request from CP.

The control flow in said entry formation will now be described in more detail with reference to FIG. 7.

A translation request 710 from CPU.0 is used to lookup the CRTs and PTE TLB2s (step 720) of all CPUs using the Segment Index (SX) portion of the applied virtual address to address the CRTs TLB2s and the Page Index (PX) portion to address the PTE TLB2s.

If a CRTs hit in CRSTE0.m—the CRTs dedicated to this CPU—is found in step 730, the PTE pointer pk in the CRTs entry is used to address either the PTE TLB2 of this CPU or of the other one (step 800).

If a valid PTE entry PTE.pk.pm.n in one of the 4 PTE arrays n (0 ... 3) is found at the address specified by the CPU number pk(0 ... 1) and the CRTs number pm(0 ... 3), then the requested absolute address 790 is read out from the selected PTE array and sent back to the requesting CPU.

An invalid CRTs entry for this CPU in step 730 triggers the translation engine to process the required CRTs entry for this CPU.0 in step 740, which is written into the CRTs array dedicated to this CPU. This CRTs is compared with all other (m=0 ... 3) CRTs entries of the other CPU (750), and if no valid entry is found, then the PTE for this CPU has to be processed (820) and written as PTE.0.m.n into the PTE TLB2. The PTE-pointer is set to 0.m, i.e. pointing to a CRTs compartment of this CPU, and the resultant absolute address is sent to the requesting CPU.

If one or more valid CRTs entries are found in step 750 then the PTO value of the CRTs of this CPU is compared with all valid PTO entries of the other CPU and a 'no match condition' transfers control to step 820.

If a PTO match is found (step 770), but no valid PTE.1.m.n, then control is transferred to step 820.

A valid PTE.1.m.n (processed by the other CPU) in step 780 is used as a final translation result for a translation request of this CPU, but it is necessary to set the PTE-pointer to '1.m', i.e. pointing to the other CPU.

With reference now to the invalidation of TLB2 entries, it should be mentioned that in case the translation tables located in main memory are modified, then all buffered values in the TLB2 formed with the modified value have to be removed.

If the page table is modified, than the PTE TLB2 must invalidate the associated entries either shared with other CPUs or dedicated to a single CPU. The sharing of PTE TLB2, however, has no influence to this invalidation process because the translation tables are single available, i.e., not redundant in main memory and are system-wide used by all CPUs.

If a CPU has to purge all entries in its dedicated TLB2 area, than all entries in the CRTs of this CPU are invalidated only. The CRSTEs dedicated to other CPUs and the jointly used TLB2 are not affected. In general, to share PTE TLB2 has no negative implications to the invalidation process.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

In particular, architecture specific adaptations are known to be necessary, when setting up a further embodiment for a different processor architecture.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for operating a second level Translation Lookaside Buffer (TLB) in a Symmetric Multiprocessor (SMP) system having multiple processors comprising the steps of:
    using a respective plurality of processor-dedicated memory areas uniquely dedicated to each of said multiple processors for storing virtual address data and an origin pointer in order to locate an absolute address associated with said virtual address data,
    using a common memory area shared between said processors for storing at least said absolute address data associated with a virtual address stored in any of said plurality of processor-dedicated memory areas, and
    defining a TLB hit on a virtual address applied by any of said processors by;
        checking if subaddress data of said applied virtual address match with respective subaddress data stored in said common memory area, and
        checking if the respective entries of the processor memory area and the common memory area are valid.

2. The method according to claim 1 in which said subaddress data is the segment index of a virtual address, and in which a plurality of least significant bits of the virtual address is stored as a tag data together with the absolute address in an entry of said common memory area.

3. The method according to claim 1 further comprising the step of performing a concurrent lookup in both the processor and the common memory area.

4. The method according to the claim 3 further comprising the step of providing a fixed number of processor memory areas associated to a respective plurality of n-set associative storage elements in the common memory area according to the sequence of said processor memory areas.

5. A Symmetric Multiprocessor (SMP) system comprising:
    multiple processors,
    a second level Translation Lookaside Buffer (TLB) in a Symmetric Multiprocessor,
    a respective plurality of processor-dedicated memory areas uniquely dedicated to each of said multiple processors for storing virtual address data and an origin pointer in order to locate an absolute address associated with said virtual address data,
    a common memory area shared between said processors for storing at least said absolute address data associated with a virtual address stored in any of said plurality of processor-dedicated memory areas, and
    a TLP hit mechanism for defining a TLB hit on a virtual address applied by any of said processors by;
        checking if subaddress data of said applied virtual address match with respective subaddress data stored in said common memory area, and
        checking if the respective entries of the processor memory area and the common memory area are valid.

6. The Symmetric Multiprocessor (SMP) system according to claim 5 wherein said subaddress data is the segment index of a virtual address, and wherein a plurality of least significant bits of the virtual address is stored as a tag data together with the absolute address in an entry of said common memory area.

7. The Symmetric Multiprocessor (SMP) system according to claim 5 wherein said TLP hit mechnism performs a concurrent lookup in both the processor and the common memory area.

8. The Symmetric Multiprocessor (SMP) system according to the claim 7 further comprising a fixed number of processor memory areas associated to a respective plurality of n-set associative storage elements in the common memory area according to the sequence of said processor memory areas.

9. The Symmetric Multiprocessor (SMP) system according to claim 8 further comprising content addressable memory used for implementing the common and the processor-dedicated memory areas.

10. A program product for operating a second level Translation Lookaside Buffer (TLB) in a Symmetric Multiprocessor (SMP) system having multiple processors, said program product comprising:
    a computer readable medium having recorded thereon computer readable program code performing the method comprising:
    using a respective plurality of processor-dedicated memory areas uniquely dedicated to each of said multiple processors for storing virtual address data and an origin pointer in order to locate an absolute address associated with said virtual address data,
    using a common memory area shared between said processors for storing at least said absolute address data associated with a virtual address stored in any of said plurality of processor-dedicated memory areas, and
    defining a TLB hit on a virtual address applied by any of said processors by;
        checking if subaddress data of said applied virtual address match with respective subaddress data stored in said common memory area, and
        checking if the respective entries of the processor memory area and the common memory area are valid.

11. The program product according to claim 10 wherein said subaddress data is the segment index of a virtual address, and in which a plurality of least significant bits of the virtual address is stored as a tag data together with the absolute address in an entry of said common memory area.

12. The program product according to claim 10 wherein said method further comprises performing a concurrent lookup in both the processor and the common memory area.

13. The program product according to the claim 12 wherein said method further comprises providing a fixed number of processor memory areas associated to a respective plurality of n-set associative storage elements in the common memory area according to the sequence of said processor memory areas.

* * * * *